United States Patent
Russell et al.

(10) Patent No.: US 7,068,897 B2
(45) Date of Patent: Jun. 27, 2006

(54) METHOD FOR RESTORING OR INCREASING PHOTOSENSITIVITY IN HYDROGEN OR DEUTERIUM LOADED LARGE DIAMETER OPTICAL WAVEGUIDE

(75) Inventors: Jerin J. Russell, Ellington, CT (US); Martin A. Putnam, Cheshire, CT (US); Jay W. Dawson, Livermore, CA (US); Trevor W. MacDougall, Simsbury, CT (US); John R. Troll, Baltimore, MD (US)

(73) Assignee: CiDRA Corporation, Wallingford, CT (US)

( * ) Notice: Subject to any disclaimer, the term of this patent is extended or adjusted under 35 U.S.C. 154(b) by 121 days.

(21) Appl. No.: 10/459,653

(22) Filed: Jun. 10, 2003

(65) Prior Publication Data

US 2004/0037504 A1    Feb. 26, 2004

Related U.S. Application Data

(60) Provisional application No. 60/387,798, filed on Jun. 10, 2002.

(51) Int. Cl.
*G02B 6/02* (2006.01)
(52) U.S. Cl. .................................. 385/123; 385/37
(58) Field of Classification Search ......... 385/123–126
See application file for complete search history.

(56) References Cited

U.S. PATENT DOCUMENTS

| 4,725,110 A | 2/1988 | Glenn et al. |
| 4,807,950 A | 2/1989 | Glenn et al. |
| 5,042,897 A | 8/1991 | Meltz et al. |
| 5,061,032 A | 10/1991 | Meltz et al. |
| 5,235,659 A * | 8/1993 | Atkins et al. ............... 385/124 |
| 5,287,427 A | 2/1994 | Atkins et al. |
| 5,388,173 A | 2/1995 | Glenn |

OTHER PUBLICATIONS

D. McStay, "Photosensitive Changes in Ge-doped fibers observed by Raman Spectroscopy", Fiber Optics '90, pp. 223-233, SPIE vol. 1315.

F. Oulette et al., "Permanent Photoinduced Birefringence in a Ge-doped Fiber", Applied Physics Letters '91, pp. 1813-1815, vol. 58.

* cited by examiner

*Primary Examiner*—Jennifer Doan

(57) ABSTRACT

The present invention provides a new and unique method for increasing the photosensitivity of a large diameter optical waveguide having a cross-section of at least about 0.3 millimeters. The method features loading the large diameter optical waveguide with a photosensitizing gas at a pressure of at least about 4000 pounds per square inch (PSI) at a temperature of at least about 250E Celsius. The photosensitizing gas may be hydrogen, Deuterium or other suitable gas. The method also includes the step of using a particular large diameter optical waveguide having a diameter of greater than 0.9 millimeters. The method may be used as part of a process for writing a Bragg grating in an inner core or a cladding of the large diameter optical waveguide.

11 Claims, 3 Drawing Sheets

METHOD FOR RESTORING OR INCREASING PHOTOSENSITIVITY IN HYDROGEN OR DEUTERIUM LOADED LARGE DIAMETER OPTICAL WAVEGUIDE

CROSS-REFERENCE TO RELATED APPLICATIONS

This application claims benefit to provisional patent application Ser. No. 60/387,798, filed Jun. 10, 2002 (CC-0325).

BACKGROUND OF THE INVENTION

1. Technical Field

The present invention generally relates to a method for writing a grating in a large diameter optical waveguide; and more particularly to a method for writing a grating in a large diameter optical waveguide in which photosensitivity is restored or increased in a hydrogen or Deuterium loaded large diameter optical waveguide.

2. Description of Related Art

It is known in the art that the presence of hydrogen, Deuterium or other suitable photosensitizing gases in a germanium doped waveguide enhances the photosensitivity of that waveguide. This is well documented in numerous references such as, "Photosensitive changes in Ge-doped fibers observed by Raman spectroscopy," D. McStay, SPIE vol. 1315 Fiber Optics '90, pp. 223–233; "Permanent photoinduced birefringence in a Ge-doped fiber," Francois Ouelette, Daniel Gagon, Michel Poirer, Applied Physics Letters, vol. 58, pp. 1813–1815, 1991; U.S. Pat. No. 5,235,659 "Method of making an article comprising an optical waveguide," Robert M. Atkins, Paul J. Lemaire, Victor Mizrahi, Kenneth L. Walker; Aug. 10, 1993; U.S. Pat. No. 5,287,427 "Method of making an article comprising an optical component, and article comprising the component," Robert M. Atkins, Paul J. Lemaire, Victor Mizrahi, Kenneth L. Walker; Feb. 15, 1994.

These prior art descriptions focus primarily on methods for increasing the photosensitivity of fiber. Fiber has several unique characteristics. Optical fiber is typically coated with an organic polymer that cannot withstand high temperatures. Single mode optical fiber is also typically 80 or 125 microns in diameter. These characteristics drive the method by which the above references incorporate hydrogen into the optical fiber. In particular, very high temperatures are not employed, as this would damage the optical fiber coating. However, low temperatures limit the diffusion rate at which hydrogen is incorporated into the glass. For 125 micron optical fiber, this is not a terrible problem as at temperatures between 50E C and 80E C (well below the damage temperatures for most fiber coatings) significant hydrogen can be diffused into the fiber in a reasonable time frame (less than 1 day). However, for significantly larger glass structures the time quickly becomes excessive.

Photosensitivity requirements can only be analyzed qualitatively at present. It was recognized that the photosensitivity requirements, for strong or multiple collocated gratings, were not met in initial H2 loading iterations. In the case of a 2.5 mm diameter Waveguide, the combination of a low photosensitivity waveguide and a concentration of $-1.44 \times 10^{20}$ ions/cm$^3$ of H2 were not sufficient to allow two gratings to be collocated without undesirable out-of-band spectral characteristics. To add a third collocated grating, it was necessary to increase the pressure by a factor of 6 (as well as reducing the temperature by 25E C to increase solubility). The resulting H2 concentration increased to $-5.47 \times 10^{20}$ ions/cm$^3$ This higher concentration has proven to be sufficient to allow collocating three gratings. However, the time required to reach 95% saturation, 21 days, is excessive and must be reduced to achieve a reasonable cycle time for volume production of collocated gratings in large waveguides. The next logical step will be to determine the effects of raising the temperature by 15–20% (absolute), to 250–275E C, which would reduce the loading time to 3–4 days with a resulting concentration of $3.46 \times 10^{20}$ ions/cm$^3$. Provided that there is still sufficient photosensitivity after the solubility losses, an additional step would be to determine if the pressure could also be reduced without causing the sideband issue to reoccur when collocating gratings.

For cylindrical geometries of 2000 microns, the time to reach a reasonable diffusion equilibrium is many days, perhaps even weeks at low temperatures.

SUMMARY OF THE INVENTION

In its broadest sense, the present invention provides a new and unique method for increasing the photosensitivity of a large diameter optical waveguide having a cross-section of at least about 0.3 millimeters (also known herein as "cane"). The method features loading the large diameter optical waveguide with a photosensitizing gas at a pressure set to provide a predetermined level of saturation based on a desired time requirement and at a temperature of at least about 250 degrees Celsius. In a preferred embodiment, the pressure is set to at least about 4000 pounds per square inch (PSI).

The photosensitizing gas may be hydrogen, Deuterium or some other suitable gas or dopant that is depleted when the dopant is written in the core. The scope of the invention is not intended to be limited to any particular photosensitizing gas or actinic radiation (typically ultraviolet (UV) light) used to write the grating.

The method also includes the step of using a particular large diameter optical waveguide having a core more than 300 microns from the surface thereof.

The method may be used as part of a process for writing a Bragg grating in an inner core or a cladding of the large diameter optical waveguide.

The method also includes writing co-located Bragg gratings having the steps of: waiting a predetermined period of time after writing a first Bragg grating for a substantial portion of the photosensitivity to be restored in the area in and around the selected part of the large diameter optical waveguide; and writing a second co-located Bragg grating in the same part, or another part, of the large diameter optical waveguide which is substantially near the selected part of the large diameter optical waveguide having the first Bragg grating. This method has the added advantage of not requiring the additional step of re-loading the hydrogen or deuterium for restoring the photosensitivity. This allows the co-location of multiple gratings without the disadvantage of a strong anneal of the first grating relative to the subsequent grating(s) during interim Hydrogen loading steps at elevated temperature.

The present invention also provides a new and unique large diameter optical waveguide having a cross-section of at least about 0.3 millimeters made by performing the steps recited in either of the aforementioned methods, or both in combination.

The foregoing and other objects, features and advantages of the present invention will become more apparent in light of the following detailed description of exemplary embodiments thereof.

BRIEF DESCRIPTION OF THE DRAWING

The drawing, not drawn to scale, include the following Figures.

BEST MODE FOR CARRYING OUT THE INVENTION

Method for Increasing the Photosensitivity in Hydrogen or Deuterium Loaded Large Diameter Optical Waveguides Given the previously documented advantages of the cane material's use in tuning and athermalizing fiber Bragg gratings, it is desirable to be able to increase the photosensitivity of the cane to enable a wider range of products to be constructed than can be constructed using the cane's inherent photosensitivity. However, the excessively long diffusion times render the standard hydrogen loading methods unsuitable for a large-scale production environment. Fortuitously, cane does not require an organic overcoat in order to maintain long-term reliability. To this end, much higher temperatures can be employed to shorten the time needed to diffuse the hydrogen into the fiber. In particular, cane greater than 2000 microns in diameter is used. A quick examination of the chart above shows that for load times significantly less than 1 week (still long for a manufacturing process), Temperatures greater than 250E C are desirable. Initially, a straight forward extension of the previous art was attempted as a means of increasing the photosensitivity of the cane to the level in which gratings of appropriate quality could be made. However, this straightforward increase in temperature failed to produce the desired increase in photosensitivity. Extensive further study showed that the solubility of hydrogen in glass declines with increasing temperature. To this end, equilibrium was achieved faster at higher temperatures, but the photosensitivity at constant pressure, was not sufficient to achieve desired goals. The figures below shows the theoretical equilibrium concentration of hydrogen at the cane core for various pressures and temperatures.

Figure 1:
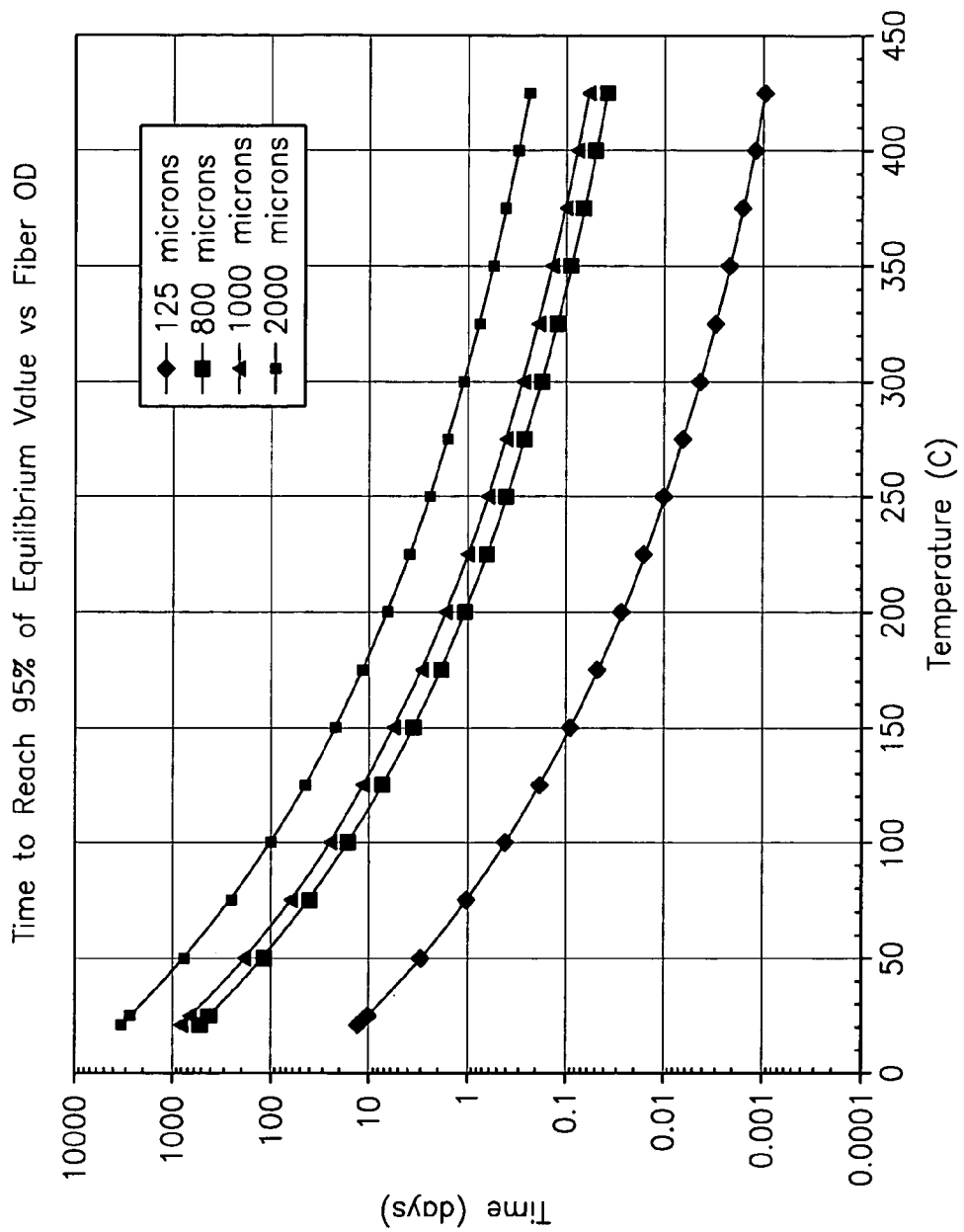
FIG. 1 is a graph of temperature (in Celsius degrees) versus time (in days) showing various times to reach a 95% of equilibrium value for four optical waveguides having different outer diameters.
Figure 2:
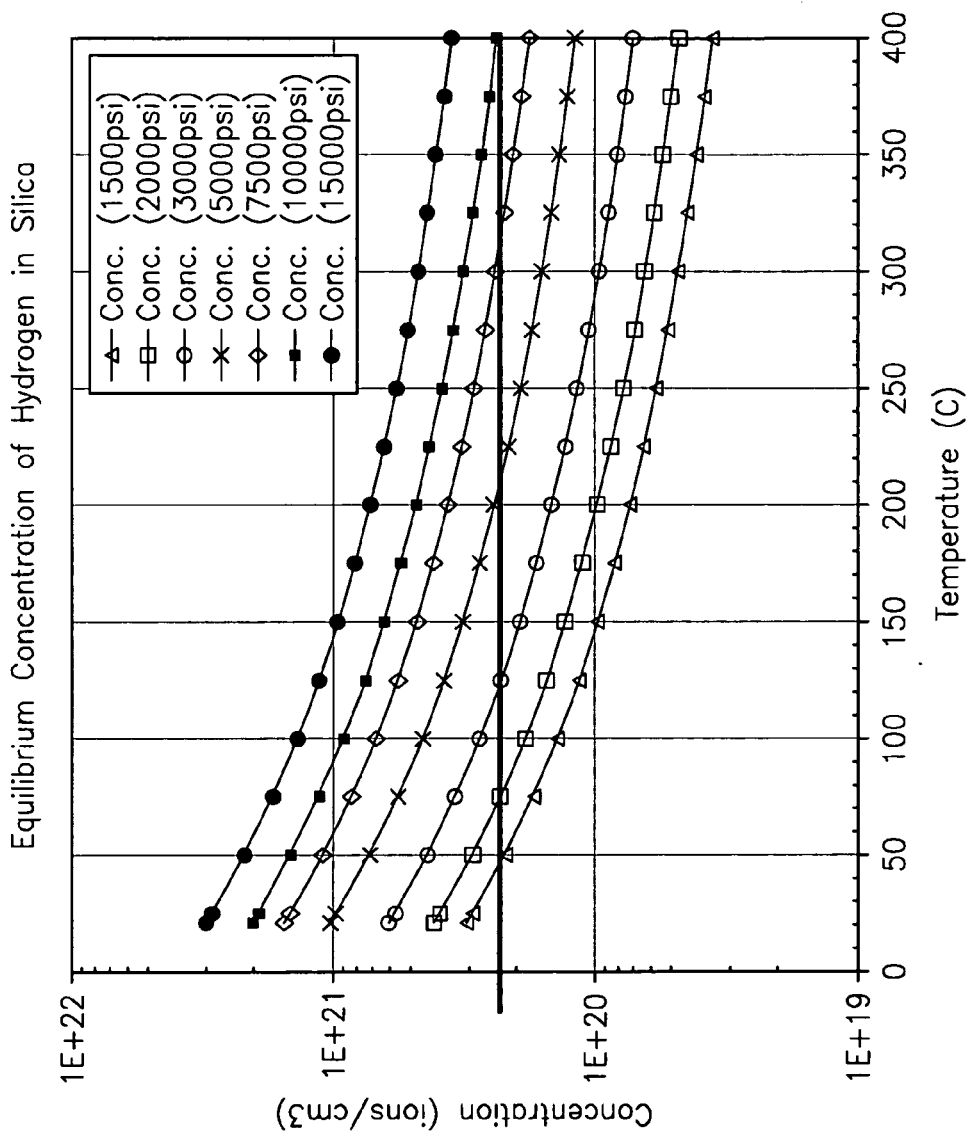
FIG. 2 is a graph of temperature (in Celsius degrees) versus concentration (in ions per cubic centimeter) showing equilibrium concentration of hydrogen in Silica for seven different concentrations.

In FIG. 2, it is clear that at temperatures greater 250E C, pressures greater than 4000 psi are required in order to realize the desired goal. These pressures and temperatures are not easily achieved safely in a production environment and considerable effort was put into designing and building a system that could do so. To this end, the present invention provides a method for increasing the photosensitivity of cane to levels needed to write state-of-the-art Bragg gratings by using pressures set to provide a predetermined level of saturation based on a desired time requirement (preferably in excess of at least about 4000 psi) and temperatures in excess of at least about 250E C. There is no known method in the prior art that discloses this combination of pressures and temperatures for hydrogen induced photosensitization of the glass. However, this method is quite useful for cane based devices and may also be useful for photowritten gratings in glass based integrated optical devices in which the core is more than 1000 microns from the glass surface.

Method for Restoring Photosensitivity in Hydrogen or Deuterium Loaded Large Diameter Optical Waveguides In general, the other feature of a collocated grating writing process is the "hold" period that is utilized between writing gratings. The level of photosensitivity required to write one 5 millimeter grating to the specifications required for an optical device such as a tunable bandpass filter is not large compared to some other 50 Ghz gratings currently written. However, the photosensitivity level required for writing three collocated gratings that all conform to desired specifications is quite large. The "hold" is the method that has been developed to allow the process to occur without the need to H2 load multiple times. This technique is a byproduct of using a large diameter waveguide. By H2 loading the core of the waveguide to a saturation condition, the surrounding cladding becomes a reservoir of available H2. When a grating is written, the region where the index change occurs becomes depleted of hydrogen. The relatively high partial pressure of the surrounding H2 forces diffusion to occur in the direction of the depleted core. The time required for the diffusion to substantially occur is on the order of 14–24 hours at 25E C corresponding to a depletion radius on axis of about 30 microns. This calculation was verified by experiments where the center wavelengths of gratings were measured in-situ at various temperatures immediately after the grating was written to monitor the change in H2 concentration. Of note is that the re-established H2 concentration then allowed a second (collocated) grating to be written which was not possible immediately after the first (i.e. no "hold" period allowed). This establishes the fact that not only was the H2 concentration re-established, but also the photosensitivity.

Figure 3:
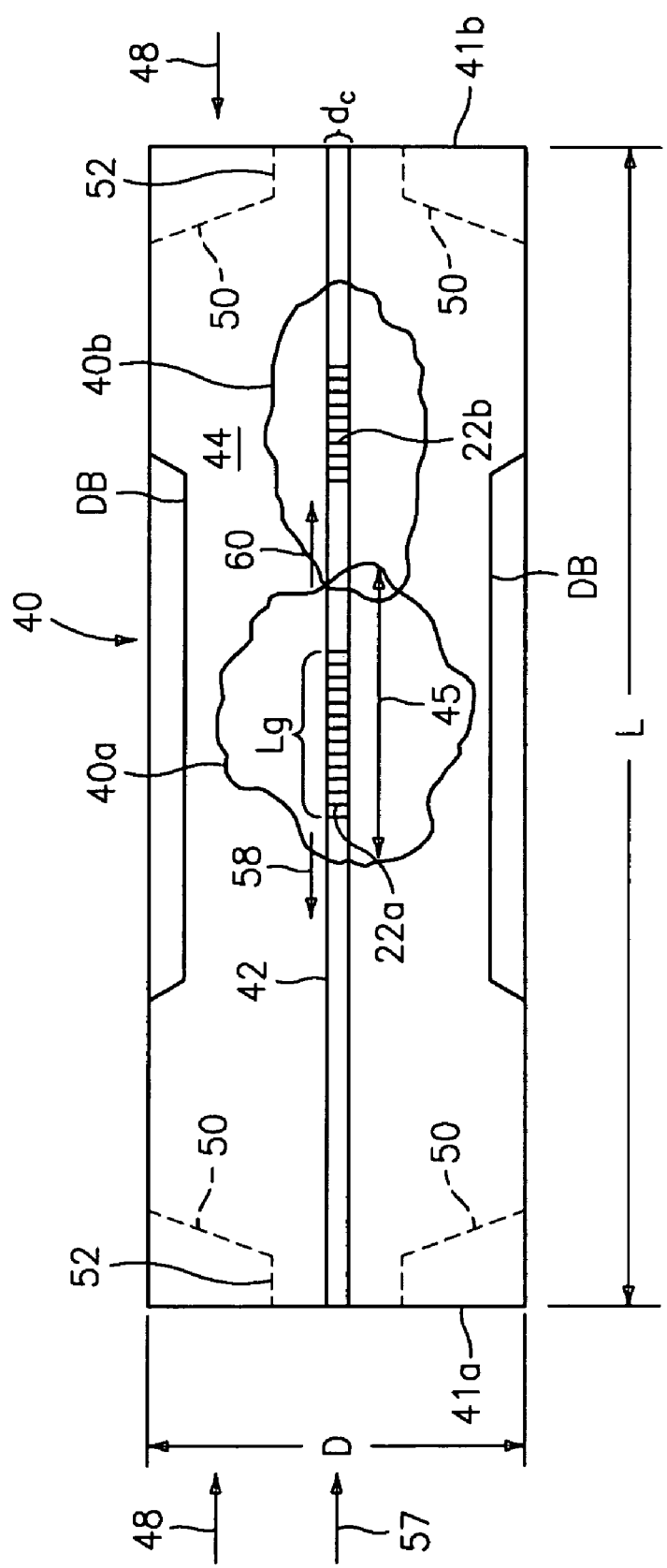
FIG. 3 is a diagram of a large diameter optical waveguide having co-located Bragg gratings written therein.

In particular, the present invention provides a method for writing co-located Bragg gratings 22a, 22b, which have at least some overlapping portion, in a large diameter optical waveguide 40 having a cross-section of at least about 0.3 millimeters shown in FIG. 3. The method features the steps of:

writing a first Bragg grating 22a in a selected part generally indicated as 40a of the large diameter optical waveguide 40; waiting a predetermined period of time after writing the first Bragg grating 22a for a substantial portion of the photosensitivity to be restored in the area in and around the selected part 40a of the large diameter optical waveguide; and writing a second co-located Bragg grating 22b in another part generally indicated as 40a or 40b of the large diameter optical waveguide 40 which is substantially near the selected part 40a of the large diameter optical waveguide 40 having the first Bragg grating 22a. The second co-located Bragg grating 22b overlaps at least a portion of the first Bragg grating 22a as shown by overlapping parts 40a or 40b.

The method may be used together with the method discussed above to also include the step of loading the large diameter optical waveguide 40 with a photosensitizing gas at a pressure at least about 4000 pounds per square inch (PSI) at a temperature of at least about 250 degrees Celsius.

In effect, this method involves waiting a predetermined period of time, after writing the Bragg Grating 22a in the waveguide for a substantial portion of the photosensitivity to be restored. This effect is produced by having a large quantity of molecular hydrogen or deuterium stored in solution in the glass waveguide. The time required to restore maximum photosensitivity is determined by three factors: initial concentration of dissolved hydrogen or deuterium; temperature; and the distance from the depleted or reduced photosensitive area of the waveguide to the un-depleted store of dissolved hydrogen.

As shown in FIG. 3, the large diameter optical waveguide 40 has an inner core 42 and an outer cladding 44 surrounding the inner core 42, opposing ends 41a, 41b, and a diameter D of at least about 0.3 millimeters, similar to that disclosed in the aforementioned co-pending U.S. patent application Ser. No. 09/455,868 (CC-0230), which is hereby incorporated by reference. The inner core 42 has the Bragg grating 22a written therein for tuning by applying a compressive force indicated by arrows 48 on the opposite ends 41a, 41b of the optical waveguide 40, or for sensing an external parameter like pressure applied thereon.

Cane waveguides have proven to be useful elements for creating highly reliable tunable grating based elements, and appear to be suitable for a variety of other applications.

One of the issues associated with the tuning of cane waveguides is the force required to tune a given cane element (typically formed in a "dogbone" element). Reducing the cane diameter can reduce the force required to tune a grating a given amount; however, the element will buckle at a lower compression strain, ultimately producing a lower tuning range.

The large diameter optical waveguide 40 comprises silica glass ($SiO_2$) based material having the appropriate dopants, as is known, to allow light indicated by arrow 45 to propagate in either direction along the inner core 42 and/or within the large diameter optical waveguide 40. The inner core 42 has an outer dimension $d_c$ and the large diameter optical waveguide 40 has an outer dimension D. Other materials for the large diameter optical waveguide 40 may be used if desired. For example, the large diameter optical waveguide 40 may be made of any glass, e.g., silica, phosphate glass, or other glasses; or solely plastic.

The outer dimension D of the outer cladding 44 is at least about 0.3 millimeters; and the outer dimension $d_c$ of the inner core 42 is such that it propagates only a few spatial modes (e.g., less than about 6). For example for single spatial mode propagation, the inner core 42 has a substantially circular transverse cross-sectional shape with a diameter $d_c$ less than about 12.5 microns, depending on the wavelength of light. The invention will also work with larger or non-circular cores that propagate a few (less than about 6) spatial modes, in one or more transverse directions. The outer diameter D of the outer cladding 44 and the length L have values that will resist buckling when the large diameter optical waveguide 40 is placed in axial compression as indicated by the arrows 48.

The large diameter optical waveguide 40 may be ground or etched to provide tapered (or beveled or angled) outer corners or edges 50 to provide a seat for the large diameter optical waveguide 40 to mate with another part (not shown herein) and/or to adjust the force angles on the large diameter optical waveguide 40, or for other reasons. The angle of the beveled corners 50 is set to achieve the desired function. Further, the large diameter optical waveguide 40 may be etched or ground to provide nubs 52 for an attachment of a pigtail assembly 54 (not shown herein) to the large diameter optical waveguide 40. Further, the size of the large diameter optical waveguide 40 has inherent mechanical rigidity that improves packaging options and reduces bend losses.

In the large diameter optical waveguide 40, the Bragg grating 22a is impressed (or embedded or imprinted) therein. A Bragg grating 22a, as is known, is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al.; and U.S. Pat. No. 5,388,173, entitled "Method and Apparatus for Forming Aperiodic Gratings in Optical Fibers", to Glenn, which are hereby incorporated by reference to the extent necessary to understand the present invention. The aperiodic variation of the gratings described herein may include a chirped grating. See also U.S. Pat. Nos. 5,042,897 and 5,061,032, both issued to Meltz et al., and hereby incorporated by reference in their entirety. As shown, the grating 22a is written in the inner core 42; however, the scope of the invention is intended to include writing the grating in the outer cladding 44, as well as a combination of the inner core 42 and the outer cladding 44. Any type of wavelength-tunable grating or reflective element embedded, etched, imprinted, or otherwise formed in the large diameter optical waveguide 40 may be used. The large diameter optical waveguide 40 may be photosensitive if the grating 22a is to be written into the large diameter optical waveguide 40. As used herein, the term "grating" means any of such reflective elements. Further, the reflective element (or grating) 22a may be used in reflection and/or transmission of light. The incoming light 57 incident on the grating 22a reflects a portion thereof as indicated by a line 58, and passes the remaining incident light 57 (within a predetermined wavelength range), as indicated by a line 60 (as is known).

The grating 22a has a grating length Lg, which is determined based on the application, and may be any desired length. A typical grating 22a has a grating length Lg in the range of about 3–40 millimeters. Other sizes or ranges may be used if desired. The length Lg of the grating 22a may be shorter than or substantially the same length as the length L of the large diameter optical waveguide 40. Also, the inner core 42 need not be located in the center of the large diameter optical waveguide 40 but may be located anywhere in the large diameter optical waveguide 40.

Accordingly, an outer diameter D of greater than about 400 microns (0.4 millimeters) provides acceptable results (without buckling) for a waveguide length L of 5 millimeters, over a grating wavelength tuning range of about 10 nm. For a given outer diameter D as the length L increases, the wavelength tuning range (without buckling) decreases. Other diameters D for the large diameter optical waveguide 40 may be used depending on the overall length L of the large diameter optical waveguide 40 and the desired amount of compression length change □L or wavelength shift □λ.

The large diameter optical waveguide 40 may be made using fiber drawing techniques that provide the resultant desired dimensions for the core and the outer diameter discussed hereinbefore. As such, the external surface of the large diameter optical waveguide 40 will likely be optically flat, thereby allowing Bragg gratings to be written through the cladding similar to that which is done for conventional optical fiber. Because the large diameter optical waveguide 40 has a large outer diameter compared to that of a standard optical fiber (e.g., 125 microns), the large diameter optical waveguide 40 may not need to be coated with a buffer and then stripped to write the gratings, thereby requiring less steps than that needed for conventional optical fiber gratings. Also, the large outer diameter D of the large diameter optical waveguide 40, allows the waveguide to be ground, etched or machined while retaining the mechanical strength of the large diameter optical waveguide 40. The large diameter optical waveguide 40 is easily manufacturable and easy to handle, and may be made in long lengths (on the order of many inches, feet, or meters) then cut to size as needed for the desired application.

Also, the large diameter optical waveguide 40 does not exhibit mechanical degradation from surface ablation common with optical fibers under high laser fluency (or power or intensity) during grating exposure (or writing). In particular, the thickness of the cladding between the cladding outer diameter and the core outer diameter causes a reduced power level at the air-to-glass interface for a focused writing beam.

The large diameter optical waveguide 40 also reduces coupling between the core and cladding modes due to the increased end cross-sectional area between the core and cladding of the waveguide. Thus, the gratings 22a written in the inner core 42 of the large diameter optical waveguide 40 exhibit less optical transmission loss and exhibits a cleaner optical profile than a conventional fiber grating because the large cladding region dissipates coupled cladding modes, thereby reducing the coupling of the inner core 42 to the outer cladding 44 modes. In general, the greater the difference in the cross-sectional area between the inner core 42 and the outer cladding 44 the smaller the mode field overlap and the lower the coupling to the cladding modes. The thickness of the outer cladding 44 between the cladding outer diameter and the core outer diameter may be set to optimize this effect. Other diameters of the inner core 42 and the large diameter optical waveguide 40 may be used if desired such that the cladding modes are reduced to the desired levels.

The large diameter optical waveguide 40 may have end cross-sectional shapes other than circular, such as square, rectangular, elliptical, clam-shell, octagonal, multi-sided, or any other desired shapes, discussed more hereinafter. Also, the waveguide may resemble a short "block" type or a longer "cane" type geometry, depending on the length of the waveguide and outer dimension of the waveguide.

In FIG. 3, the large diameter optical waveguide 40 is shown with a uniform diameter; however, the scope of the invention is intended to include the large diameter optical waveguide 40 being shaped as a dogbone as indicated by line DB1, DB2 in FIG. 3 with a diameter of wider end portions of about 2–5 millimeters and a diameter of the intermediate portion of about ½–1.5 millimeters. The scope of the invention is intended to include the large diameter optical waveguide being at least 0.3 millimeters, 0.4 millimeters, 0.5 millimeters, 0.6 millimeters, 0.7 millimeters, 0.8 millimeters, at least 0.9 millimeters, 1.0 millimeters, 1.1 millimeters, 1.2 millimeters, 1.3 millimeters, or 1.4 millimeters or greater.

Finally, a similar effect for restoring photosensitivity is also possible in optical fiber but may (or may not) require repeating the initial procedure used for hydrogen or deuterium loading. The main difference between the claims is the amount of additional photosensitivity available without the possible additional re-loading step. This step is not required for large diameter waveguides due to the large supply to stored hydrogen available.

The Scope of the Invention

It should be understood that, unless stated otherwise herein, any of the features, characteristics, alternatives or modifications described regarding a particular embodiment herein may also be applied, used, or incorporated with any other embodiment described herein.

For example, although the invention is described in relation to Bragg grating, the inventors envision other embodiments using blazed gratings, periodic or aperiodic gratings, long period gratings, or chirped gratings.

Although the invention has been described and illustrated with respect to exemplary embodiments thereof, the foregoing and various other additions and omissions may be made therein without departing from the spirit and scope of the present invention.

What is claimed is:

1. A method for writing a Bragg grating in a large diameter optical waveguide having a cross-section of at least about 0.3 millimeters, an inner core and a cladding surrounding the inner core, comprising:

loading the large diameter optical waveguide with a photosensitizing gas at a pressure at least about 4000 pounds per square inch (PSI) at a temperature of at least about 250 degrees Celsius; and writing at least one Bragg grating in a selected part of the large diameter optical waveguide.

2. A method according to claim 1, wherein the photosensitizing gas is hydrogen.

3. A method according to claim 1, wherein the photosensitizing gas is Deuterium.

4. A method according to claim 1, wherein the method includes using a particular large diameter optical waveguide having a diameter greater than 0.9 millimeters.

5. A method according to claim 1, wherein the method includes writing the at least one Bragg grating in the inner core of the large diameter optical waveguide.

6. A method according to claim 1, wherein the method includes writing the at least one Bragg grating in a cladding of the large diameter optical waveguide.

7. A method according to claim 1, wherein writing includes exposing the large diameter optical waveguide to ultraviolet light.

8. A method according to claim 1, wherein the method includes writing co-located Bragg gratings comprising:

waiting a predetermined period of time after writing a first Bragg grating for a substantial portion of the photosensitivity to be restored in the area in and around the selected part of the large diameter optical waveguide; and writing a second co-located Bragg grating in another part of the large diameter optical waveguide which is substantially near and around the selected part of the large diameter optical waveguide having the first Bragg grating.

9. A method according to claim 1, wherein the large diameter optical waveguide is at least 0.3 millimeters, 0.4 millimeters, 0.5 millimeters, 0.6 millimeters, 0.7 millimeters, 0.8 millimeters, at least 0.9 millimeters, 1.0 millimeters, 1.1 millimeters, 1.2 millimeters, 1.3 millimeters, or 1.4 millimeters or greater.

10. A method according to claim 1, wherein said outer dimension of said optical waveguide in the transverse direction is greater than about the dimension selected from the group consisting of 0.5 mm, 0.6 mm, 0.7 mm, 0.8 mm, 1.0 mm, 1.2 mm, 1.4 mm, 1.6 mm, 1.8 mm, 2.0 mm, 2.1 mm, 2.3 mm, 2.5, mm, 2.7 mm, 2.9 mm, 3.0 mm, 3.3 mm, 3.6 mm, 3.9 mm, 4.0 mm, 4,2 mm, 43 mm, 4.7 mm, 5.0 mm, 6.0 mm, 7.0 mm, 8.0 mm, 9.0 mm, 1.0 cm, 5.0 cm, 10.0 cm, and 20.0 cm.

11. A method according to claim 1, wherein said length of said optical waveguide along the longitudinal direction is greater than about the dimension selected from the group consisting of 3 mm, 5 mm, 7 mm, 9 mm, 10 mm, 12 mm, 14 mm, 16 mm, 18 mm, 20 mm, 21 mm, 23 mm, 25, mm, 27 mm, 29 mm, 30 mm, 32 mm, 34 mm, 36 mm, 38 mm, 40 mm, 45 mm, 50 mm, 55 mm, 60 mm, 65 mm, 70 mm, 75 mm, 80 mm, 85 mm, 90 mm, 95 mm, 100 mm, 20 cm, 30 cm, 40 cm, 50 cm and 100 cm.

* * * * *